United States Patent [19]
Mills

[11] 3,771,494
[45] Nov. 13, 1973

[54] MILKING INFLATIONS

[76] Inventor: Geoffrey Spottiswoode Mills, Walton, Hamilton, New Zealand

[22] Filed: May 24, 1972

[21] Appl. No.: 256,457

[30] Foreign Application Priority Data
May 27, 1971   New Zealand...................... 163789

[52] U.S. Cl............................ 119/14.47, 119/14.49
[51] Int. Cl. .............................................. A01j 5/06
[58] Field of Search .............119/14.47–14.55, 14.36

[56] References Cited
UNITED STATES PATENTS
2,502,956   4/1950   Jansson............................ 119/14.52
2,744,496   5/1956   Roben............................... 119/14.47
2,896,573   7/1959   Schalm ............................. 119/14.36

FOREIGN PATENTS OR APPLICATIONS
1,003,968   9/1965   Great Britain

Primary Examiner—Hugh R. Chamblee
Attorney—John C. Holman et al.

[57] ABSTRACT

A teat cup milking inflation is disclosed, said inflation being constructed from a natural or synthetic rubber material or from an elastomeric plastics material and having an integral flexible and resilient collar portion with a tapered feathered inner edge portion surrounding the mouth of the inflation. The tapered edge portion of the collar has a flat upper edge portion which can lie flat on the surface of an animal's teat when the inflation is engaged thereon, the collar being flexed inwardly of the inflation so that the tapered feathered edge portion is directed downwardly towards the end of the teat.

9 Claims, 5 Drawing Figures

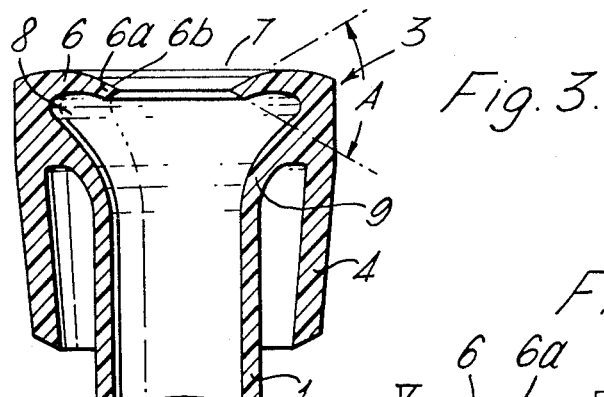
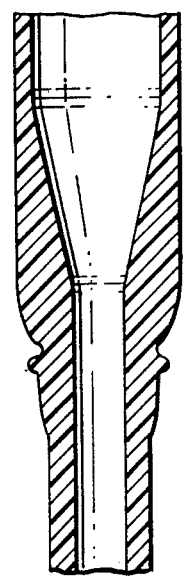
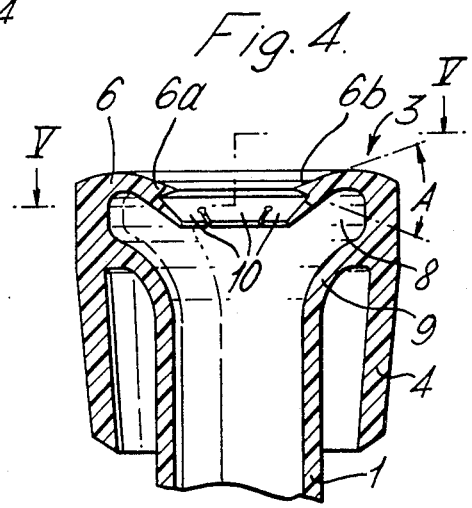
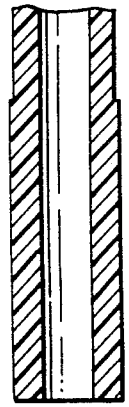
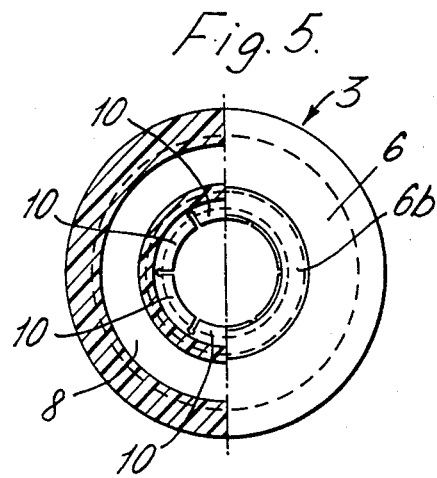
Fig. 3.
Fig. 4.
Fig. 5.

MILKING INFLATIONS

BACKGROUND OF THE INVENTION

This invention relates generally to milking inflations and more particularly it relates to the head or mouth end portions of milking inflations or liners for teat cups and to a manner in which they are engaged on the teats of an animal to be milked.

The construction of many milking inflations, particularly at the head or mouth ends, provides that the inflations have a resilient collar to engage and seal upon the teat of an animal in a manner whereby sometimes undue pressure is applied to the teat over a very small contact area in order to obtain the required seal, and such pressure over the small area can irritate the animal being milked.

SUMMARY OF THE INVENTION

An object of this invention is to provide an improved construction of inflation, in particular an improved construction of a mouth piece or teat engaging collar for an inflation, whereby the required vacuum seal is obtainable with a minimum of pressure and the effective teat contact area of the collar at the mouth of the inflation is increased so that the sealing pressure is thus spread over a slightly larger area than normal in order to minimize the risk of such pressure irritating the animal.

Other objects and advantages of the invention will become apparent from the ensuing description.

According to this invention, there is provided a teat cup milking inflation characterized by the provision at the mouth of the inflation of a flexible and resilient teat engaging collar which has a tapering feathered edge formation with an included angle (in cross section) of less than 80° and with a flat upper peripheral edge portion surrounding the mouth, the collar being arranged to flex inwardly and downwardly at the mouth of the inflation on engagement with the teat of an animal so that the said flat peripheral edge portion will lie flat on the teat surface with the tapered feathered edge directed towards the end of the teat.

BRIEF DESCRIPTION OF THE DRAWING

The invention will now be described by way of example and with reference to the accompanying drawings, wherein:

FIG. 3 is a longitudinal sectional and partly broken view illustrating a typical complete inflation detached from the usually provided teat cup shell and before attachment to the teat of an animal; this inflation includes a slight modification to the shape of its upper part, FIG. 4 is a longitudinal sectional view illustrating a further modification to the upper part of the inflation according to the invention, and FIG. 5 is a part sectional plan view on line V—V of FIG. 4.

DETAILED DESCRIPTION OF THE PREFERRED EMBODIMENTS

The inflation may be constructed by any suitable means such as from a natural or synthetic rubber material, or an elastomeric vinyl plastics material such as a polyvinyl chloride or other suitable plastics material having properties desirable in the construction of milking inflations, i.e., desirable resilient qualities and qualities which facilitate cleaning and sterilizing of the inflation without the inflation absorbing or retaining any of the cleaning or sterilizing agents which could irritate an animal or contaminate the milk received from the animal. The invention is particularly concerned with the teat engaging collar portions of the inflations, and the remaining parts of the inflations may vary in accordance with particular requirements.

Figure 1:
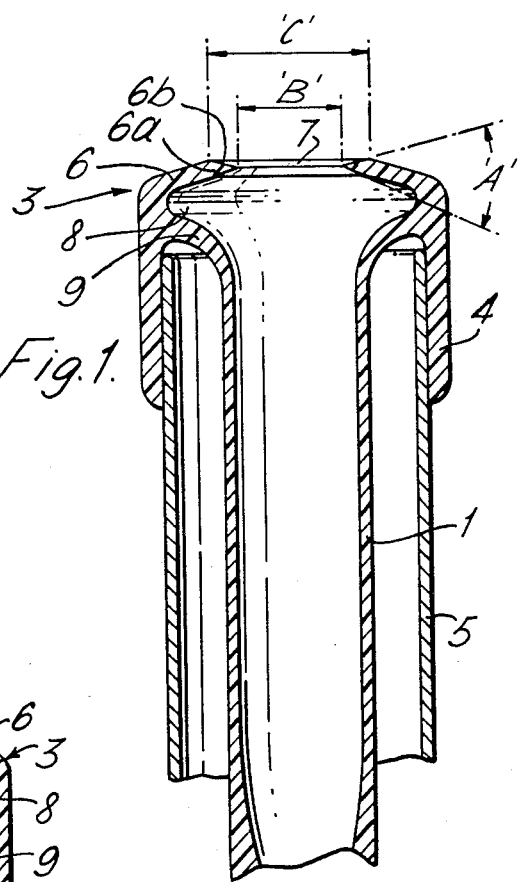
FIG. 1 is a longitudinal sectional view illustrating the upper part of a first preferred construction of milking inflation in accordance with the invention, and this view is taken before the engagement with the teat of an animal.
Figure 2:
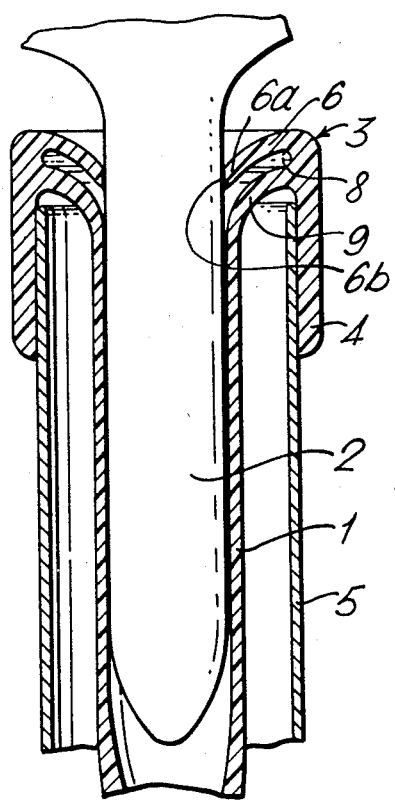
FIG. 2 is a longitudinal sectional view of the inflation of FIG. 1 fitted to the teat of an animal to be milked and illustrates the inflation collar in its flexed operative position.

In the illustrated forms of the invention and by referring particularly to FIGS. 1, 2 and 3 of the drawings, the inflation has a cylindrical resilient body part 1 which is positioned about the major part of the teat 2 of an animal. The body part 1 merges into an integral head part, generally indicated by the arrow 3, having an outer downwardly extending angular flange 4 spaced from the body part 1 and positioned about a teat cup shell 5 within which the inflation body part 1 is housed. The teat cup shell 5 may be a metal or any other suitable rigid material, and the inner teat cup shell engaging surface of the flange 4 may be smooth, as indicated, or can be serrated or ribbed in providing the required seal between the flange 4 and teat cup shell 5.

The inflation collar 6 surrounding the inflation mouth 7 extends inwardly at the upper end of the head, and an annular space 8 may be provided between the collar 6 and junction 9 which is located between the body part 1 and flange 4 to permit greater flexibility of the collar 6. The inwardly extending collar 6 may lie in a flat plane generally normal to the axis of the inflation prior to engagement with an animal's teat, or (as illustrated in FIG. 1) may be of flat cross section and be normally inclined slightly upwardly towards the mouth 7 of the inflation or (as illustrated in FIGS. 3 and 4) can be of arcuate cross section extending upwardly and then downwardly towards the mouth 7.

The peripheral edge portion 6a of the collar 6 surrounding the mouth 7 is tapered and feathered towards the mouth 7 in order to provide, in cross-section, an included angle 'A' of less than 80° and a flat normally inclined upper surface 6b. Preferably the included angle taper is between 30° and 60°, for example 45°, and the flat upper surface 6b may be in the region of three-sixteenths of an inch in width, but can be more than three-sixteenths of an inch.

The diameter of the inflation mouth 7 and the angle of the flat upper surface 6b in relation to the collar 6 is such that when the inflation is engaged on the teat 2 of the animal to be milked, as indicated in FIG. 2 of the drawings, the collar 6 is flexed inwardly and downwardly of the inflation and the flat peripheral surface 6b of the collar 6 lies flat against the surface of the teat 2 with the mouth periphery or feathered edge of the collar 6 directed downwardly towards the lower end of the teat 2. An example of suitable dimensions is for an inflation a diameter of 2 5/32 of an inch at the feathered edge (diameter 'B') and a diameter of 1 1/8 of an inch larger than the flat upper surface 6b (diameter 'C').

It will thus be seen that the sealing pressure exerted by the flexible collar 6 on the teat 2 of the animal is spread over a flat teat engaging surface 6b and the sharply tapering formation of the peripheral edge portion 6a of the collar 6 requires that a minimum of pressure is required to be exerted on the teat 2 in order to obtain the desired seal between the inflation and the teat 2. The arrangement further provides that the inflation is easy to remove from the teat 2 of the milked animal when the vacuum supply to the inflation is stopped, and the tapered mouth surrounding peripheral edge portion 6a of the collar 6 provides that the inflation and teat cup of which it is a part will not accidentally fall off the teat 2.

In different embodiments of the invention, and as illustrated by way of examples in FIGS. 4 and 5 of the drawings, a plurality (preferably six or more) of downwardly and inwardly directed thin flexible teat gripping members 10 may be annularly disposed below and co-axial with the mouth 7 of the inflation in order to provide added grip when the inflation is engaged with the animal's teat, and thus this prevent accidental dislodgement of the inflation. The additional teat gripping members 10 can be formed out of a segmented inclined ring part of the inflation formed integrally with the collar 6 and extending from a point adjacent the mouth edge portion 6a, and the provision of such additional gripping members 10 may permit the collar 6 to be lessened in thickness and thus have greater flexibility.

Particular forms of the invention have been described and illustrated by way of examples with reference to the accompanying drawings, but it will be appreciated that other variations and embodiments to the invention can take place without departing from the scope of the appended claims.

I claim:

1. A teat cup milking inflation characterized by the provision at the mouth of the inflation of a flexible and resilient teat engaging collar which has a tapering feathered edge formation with an included angle (in cross section) of less than 80° and with a flat upper peripheral edge portion surrounding the mouth, the collar being arranged to flex inwardly and downwardly at the mouth of the inflation on engagement with the teat of an animal so that said flat peripheral edge portion will lie flat on the teat surface with said tapered feathered edge directed towards the end of the teat.

2. A milking inflation as claimed in claim 1, wherein said collar lies generally in a flat plane normal to the axis of said inflation prior to engagement with the animal's teat.

3. A milking inflation as claimed in claim 1, wherein said collar is of generally flat cross section and is normally inclined slightly upwardly towards the mouth of said inflation prior to engagement with the animal's teat.

4. A milking inflation as claimed in claim 1 wherein said collar is of arcuate cross section extending upwardly from said collar outer periphery and then downwardly towards said mouth of the inflation prior to engagement with the animal's teat.

5. A milking inflation as claimed in claim 1, wherein said included angle of said tapering feathered edge of said collar is between 30° and 60°.

6. A milking inflation as claimed in claim 1, wherein said flat upper peripheral edge portion of said collar is approximately three-sixteenths of an inch in width.

7. A milking inflation as claimed in claim 1, wherein a plurality of downwardly and inwardly directed thin flexible teat gripping members 10 are annularly disposed below and co-axial with the mouth of said inflation to provide additional grip when said inflation is engaged with the teat of the animal.

8. A milking inflation as claimed in claim 7, wherein there are at least six said teat gripping members.

9. A milking inflation as claimed in claim 7, wherein said teat gripping members are formed out of a segmented inclined ring part of said inflation formed integrally with said collar and extending from a point adjacent the mouth edge portion.

* * * * *